United States Patent
Kishibe et al.

(10) Patent No.: US 7,441,410 B2
(45) Date of Patent: Oct. 28, 2008

(54) GAS TURBINE AND MANUFACTURING PROCESS OF GAS TURBINE

(75) Inventors: Tadaharu Kishibe, Hitachinaka (JP); Yasuo Takahashi, Mito (JP); Hisashi Hamatake, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 399 days.

(21) Appl. No.: 10/963,566

(22) Filed: Oct. 14, 2004

(65) Prior Publication Data

US 2005/0223708 A1    Oct. 13, 2005

(30) Foreign Application Priority Data

Oct. 31, 2003    (JP)    ............... 2003-371423

(51) Int. Cl.
*F02C 3/00*    (2006.01)

(52) U.S. Cl. .................... 60/772; 60/39.53; 60/801; 29/889.2

(58) Field of Classification Search ............ 60/775, 60/801, 39.53, 39.55, 772; 29/889.2
See application file for complete search history.

(56) References Cited

U.S. PATENT DOCUMENTS

| | | | | |
|---|---|---|---|---|
| 4,829,763 A | * | 5/1989 | Rao | .................... 60/775 |
| 6,119,445 A | * | 9/2000 | Bronicki et al. | ............ 60/39.53 |
| 6,305,158 B1 | * | 10/2001 | Nakhamkin et al. | ........ 60/39.53 |
| 6,389,799 B1 | * | 5/2002 | Hatamiya et al. | ........... 60/39.53 |
| 6,644,013 B1 | * | 11/2003 | Hatamiya et al. | ........... 60/39.53 |
| 6,865,893 B2 | * | 3/2005 | Koganezawa et al. | ......... 60/801 |

FOREIGN PATENT DOCUMENTS

JP    2001-271792    10/2001

OTHER PUBLICATIONS

Desideri et al., "Upgrading of a Small Size Gas Turbine to HAT Cycle Operation: Thermodynamic and Economic Analysis." Jun. 7-10, 1999, ASME Paper 99-GT-372, pp. 1-10.*
IGTC2003, Tokyo, TS-900.

* cited by examiner

*Primary Examiner*—Ted Kim
(74) *Attorney, Agent, or Firm*—Mattingly, Stanger Malur & Brundidge, P.C.

(57) ABSTRACT

The invention is intended to maintain turbine reliability when, based on a gas turbine designed for one desired cycle, a gas turbine for another different cycle is manufactured. A channel of a compressor is formed such that a mass flow of a fluid compressed by the compressor changes. Thus, when manufacturing, based on the gas turbine designed for one desired cycle, the gas turbine for another different cycle, turbine reliability can be maintained.

2 Claims, 10 Drawing Sheets

GAS TURBINE AND MANUFACTURING PROCESS OF GAS TURBINE

BACKGROUND OF THE INVENTION

1. Field of the Invention

The present invention relates to a gas turbine and a manufacturing process of a gas turbine.

2. Description of the Related Art

When a gas turbine for mixing and burning humid air and fuel is manufactured based on a simple-cycle or combined-cycle gas turbine that has already been designed, the mass flow of a working fluid in the turbine increases because combustion gas supplied to the turbine is humidified. However, since a turbine output cannot be changed, the mass flow of the working fluid in the compressor must be reduced.

Patent Reference 1 (JP,A 2001-271792) discloses a technique of forming a longitudinal groove to locally increase the cross-sectional area of a channel in the compressor. The provision of the longitudinal groove locally increases the cross-sectional area of the compressor channel and locally reduces the average Mach number of an air stream near the front edge of a blade, thereby increasing the compressor efficiency.

SUMMARY OF THE INVENTION

However, the technique disclosed in Patent Reference 1 is just intended to increase the compressor efficiency by locally changing the cross-sectional area of the compressor channel. In other words, reducing the mass flow of the working fluid in the compressor is not taken into account.

An object of the present invention is to maintain turbine reliability when, based on a gas turbine designed for one desired cycle, a gas turbine for another different cycle is manufactured.

To achieve the above object, the present invention is featured in forming a channel of a compressor such that a mass flow of a fluid compressed by the compressor changes.

According to the present invention, the turbine reliability can be maintained when, based on a gas turbine designed for one desired cycle, a gas turbine for another different cycle can be manufactured.

DESCRIPTION OF THE PREFERRED EMBODIMENTS

Figure 11:
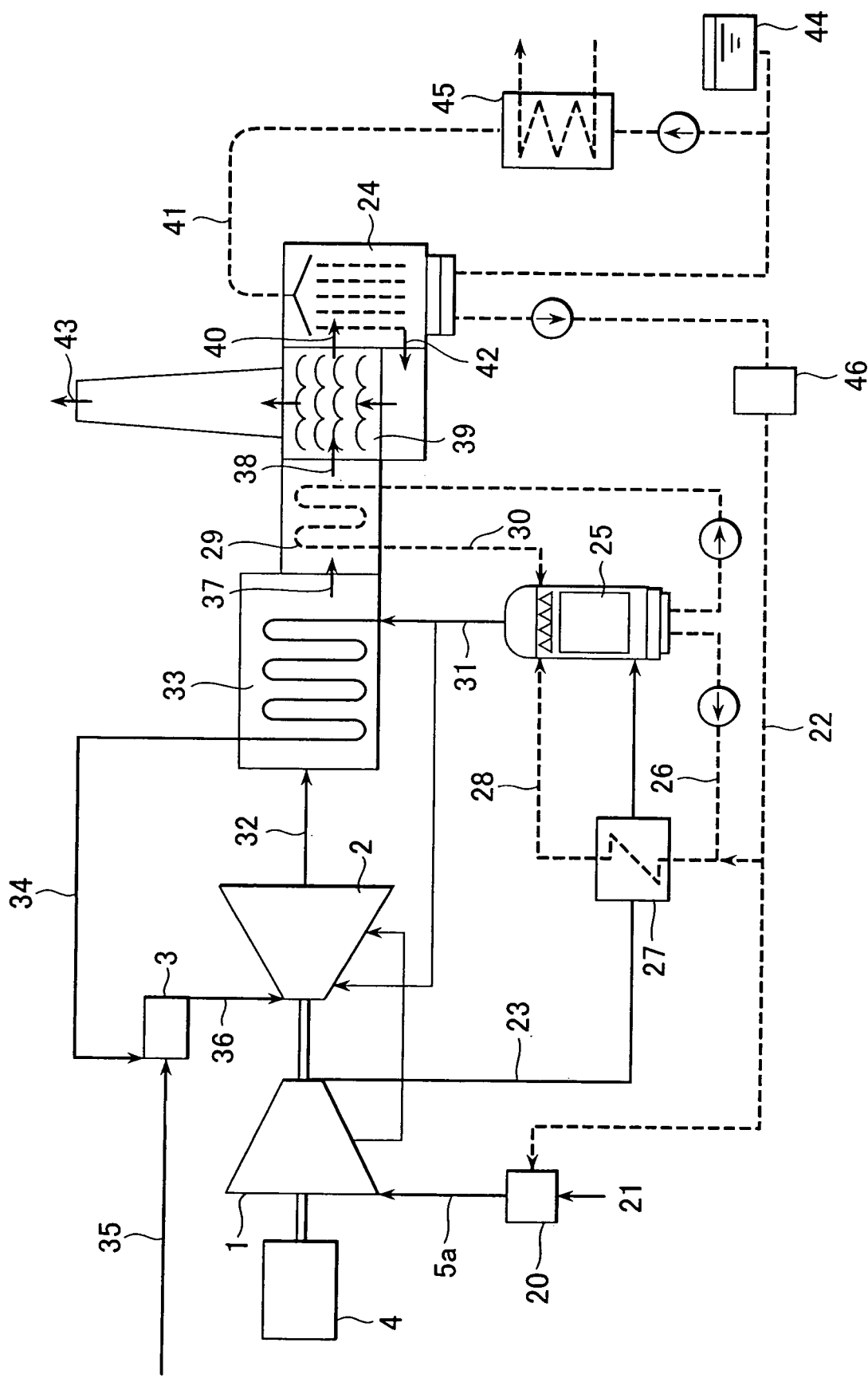
FIG. 11 is a diagram of the humidified air turbine cycle.

As a gas turbine plant with high efficiency, there is known a gas turbine cycle (humidified air turbine cycle) in which humid air produced by a saturator and fuel are mixed and burnt to generate combustion gas for rotating a turbine. FIG. 11 is a diagram of the humidified air turbine cycle. A description is first made of a flow within the humidified air turbine cycle from a point at which the atmosphere sucked into a compressor 1 becomes humid air to a point at which the humid air is finally discharged to the exterior. A mixer 20 sprays water 22 to the atmosphere 21 to produce humid air 5a. The humid air 5a produced by the mixer 20 is compressed by the compressor 1, and the compressed air produced by the compressor 1 is extracted through a bleed hole formed halfway a gas path. High-pressure air 23 extracted from the compressor 1 is supplied to an air cooler 27 for cooling the high-pressure air 23 by recovered water 22 from a water recovery unit 24 and recovered water 26 from a saturator 25. The high-pressure air 23 cooled by the air cooler 27 is humidified by the saturator 25 using water 28 heated through the air cooler 27 and water 30 heated through an economizer 29. Humid air 31 humidified by the saturator 25 is supplied to a recuperator 33 for overheating the humid air 31 by exhaust gas 32 from a turbine 2. Then, the recuperator 33 overheats the humid air 31 supplied from the saturator 25 to produce humid air 34 that is supplied to a combustor 3. The humid air 34 supplied to the combustor 3 is mixed with fuel 35 and burnt in the combustor 3. Produced combustion gas 36 is supplied to the turbine 2 for rotating the turbine 2. Exhaust gas 32 discharged from the turbine 2 is introduced to the recuperator 33 for heat recovery and is supplied as exhaust gas 37 to the economizer 29. The economizer 29 supplies, to an exhaust gas reheater 39, exhaust gas 38 obtained after recovering heat from the exhaust gas 37. Exhaust gas 40 discharged from the exhaust gas reheater 39 is supplied to the water recovery unit 24 for cooling the exhaust gas 40 by cooling water 41 to condense moisture so that water is recovered. Then, exhaust gas 42 discharged from the water recovery unit 24 is returned to the exhaust gas reheater 39, whereby exhaust gas 43 discharged to the exterior can be prevented from generating white smoke. In addition, the compressor 1 and the turbine 2 are coupled to each other by an intermediate shaft, and a generator 4 for converting shaft motive power produced from the turbine 2 into electric power is also coupled to a rotary shaft of the compressor 1.

A water circulation system will be described below. In order to supply water to the water recovery unit 24 for cooling the exhaust gas 40 and recovering water, a gas turbine plant of this embodiment is equipped with a water tank 44 from which water is replenished. The water replenished from the water tank 44 is supplied to a cooler 45 for cooling the water. The water recovery unit 24 cools the exhaust gas 40 discharged from the exhaust gas reheater 39 by the cooling water 41 having been cooled, so that moisture condenses for water recovery. Further, the water discharged from the water recovery unit 24 is supplied again to the cooler 45, and is also supplied to a water treating unit 46 in which the water is pre-treated for supply to the gas turbine. Water 22 treated by the water treating unit 46 is supplied to the mixer 20 for spraying the water 22 into the atmosphere 21 to produce the humid air 5a, and is also supplied to the air cooler 27 for cooling the high-pressure air 23. Thus, the water supplied to the mixer 20 is injected to the humid air 5a and then supplied to the compressor 1. On the other hand, the water supplied to the air cooler 27 is heated through the air cooler 27, and the heated water 28 is supplied to the saturator 25. The saturator 25 employs the water 28 to humidify the high-pressure air 23 supplied from the air cooler 27. The water after being used in the saturator 25 is supplied again to the air cooler 27, as well as to the economizer 29. In the economizer 29, the water 30 discharged from the saturator 25 and flowing in the water circulation system is heated by the exhaust gas 37, serving as a heat source, which is obtained after recovering heat from the exhaust gas 37 in the recuperator 33, thereby producing heated water. The thus-heated water is supplied to the saturator 25. In such a way, the heated water is supplied to the saturator 25 from not only the air cooler 27, but also from the economizer 29.

When moisture is added to the high-pressure air 23 extracted from the compressor 1 as described above, an air mass flow increases. For that reason, when a gas turbine for the humidified air turbine cycle is manufactured based on a gas turbine designed for a simple cycle (i.e., a base plant), the mass flow of a working fluid in the turbine (turbine mass flow) increases corresponding to the added moisture and so does a gas turbine output. An increase of the gas turbine output causes the necessity of modifying bearings and a shaft of the turbine, the generator, etc. Further, with an increase of the turbine mass flow, the operating pressure ratio of the compressor coupled to the turbine through the intermediate shaft increases and a surge margin decreases. The compressor is a machine for boosting the pressure of a sucked fluid, and a ratio of two pressures before and after the boosting is called a pressure ratio. The term "surge margin" means a margin between the pressure ratio at which a surging phenomenon occurs and the pressure ratio at an actual operating point. The term "surging phenomenon" means a phenomenon that, when the pressure ratio increases, vigorous pulsations of pressure and flow and mechanical vibrations are abruptly generated along with strong noises at a certain pressure ratio, and the operation is brought into an unstable state. In other words, the gas turbine for the humidified air turbine cycle must be manufactured without significantly changing the operating pressure ratio of the compressor and the gas turbine output in the base plant.

A description is now made of a mass flow balance in each of several gas turbine cycles.

Figure 13:
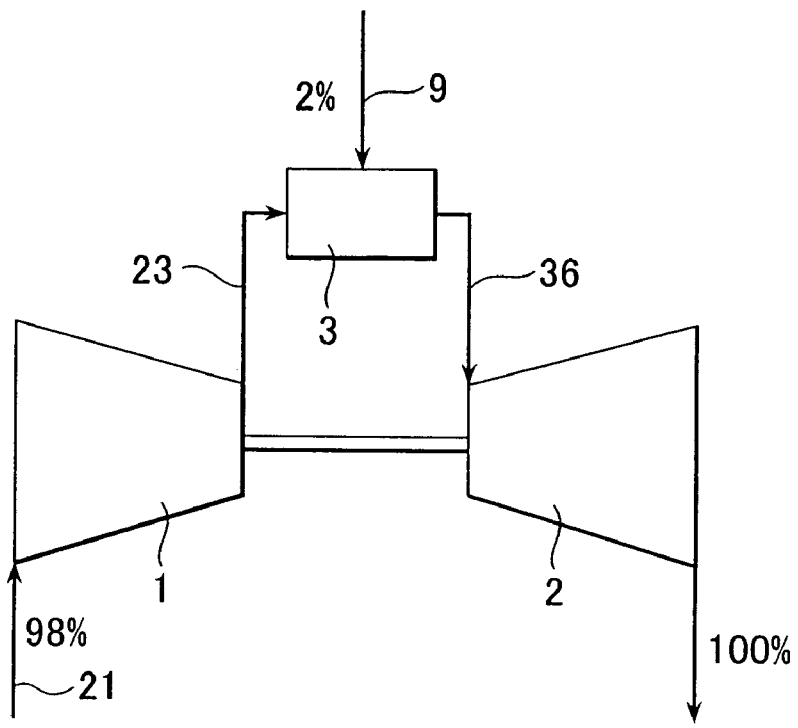
FIG. 13 is a schematic view representing a mass flow balance in the simple cycle.

In the simple-cycle gas turbine, as shown in FIG. 13, air (atmosphere) 21 sucked by a compressor 1 is compressed to produce compressed air 23. The compressed air 23 thus produced is introduced to a combustor 3 where the compressed air is mixed with fuel 9 and burnt to produce combustion gas 36 at high temperature and high pressure. The combustion gas 36 flows into a turbine 2 for rotating the turbine 2, and a generator coupled to the turbine 2 generates electric power. The mass flow balance between the turbine and the compressor in the simple-cycle gas turbine is such that, assuming the turbine mass flow to be 100%, the mass flow of working air in the compressor is 98% and the mass flow of fuel supplied to the combustor is 2%.

Figure 14:
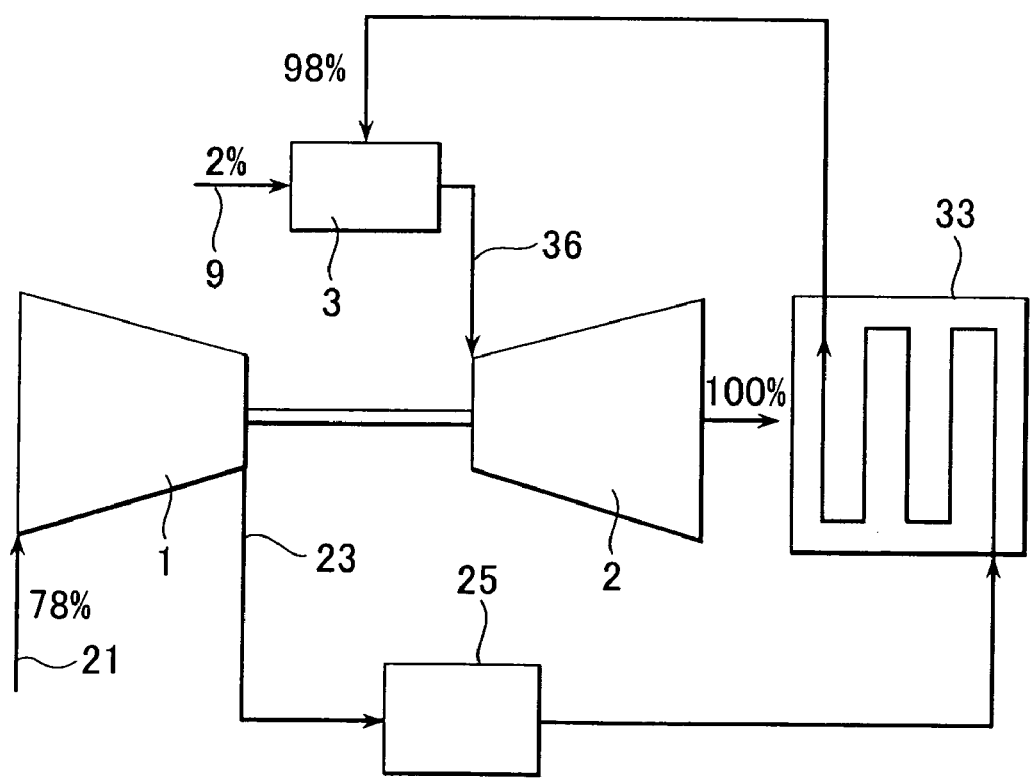
FIG. 14 is a schematic view representing a mass flow balance in the humidified air turbine cycle.

FIG. 14 represents a mass flow balance when the gas turbine for the humidified air turbine cycle is manufactured based on the gas turbine designed for the simple cycle. High-pressure air extracted from the compressor 1 is added with moisture and then introduced to the combustor 3 through a recuperator 33. Therefore, the air mass flow increases 20%. In consideration of such an increase of the air mass flow, it is the best from the viewpoints of reliability and manufacturing cost to design the compressor such that the inlet mass flow of the compressor is 78%. With that design, neither the turbine mass flow nor the gas turbine output increase, and hence there is no necessity of modifying the bearings and shaft of the gas turbine, the generator, etc. Accordingly, the surge margin of the compressor can be maintained. Further, since the turbine as a high-temperature component can be the same as that in the base plant, it is possible to reduce the manufacturing cost, cut the manufacturing steps, and ensure reliability. In addition, since the fuel mass flow in the combustor is in common to the base plant, there is no necessity of modifying auxiliary piping for a fuel system.

A method of omitting or adding front-side stages of the compressor is known as a practical method for changing the mass flow of the working fluid from that in the compressor of the base plant designed for the simple cycle. For the purpose of reducing the mass flow of the working fluid, the front-side stages of the compressor are omitted in some cases. However, this method requires addition of many rear-side stages to maintain matching of the operating pressure ratio of the compressor and raises a problem of increasing the cost. Also, because the mass flow of the working fluid is determined depending on the number of the omitted front-side stages, the mass flow of the working fluid required in the humidified air turbine cycle is not always obtained. Another conceivable method is to extract air from a midpoint stage or a delivery hole of the compressor, thereby reducing the mass flow of the working fluid introduced to the turbine. However, this method has a problem of lowering overall thermal efficiency of the gas turbine because the working fluid having been compressed by the use of motive power is discarded. An additional problem is that extraction of air from the midpoint of the compressor causes mismatching between both sides before and after the extracting stage, thus resulting in deterioration of the compressor efficiency. A method of modifying a plant scale is further conceivable. When reducing the mass flow of the working fluid in the compressor, a new compressor may be manufactured, for example, in a scale corresponding to the root of an amount by which the mass flow is reduced from that in the base plant. With that method, however, components and drawings are not in common to those used in the base plant.

First Embodiment

Figure 6:
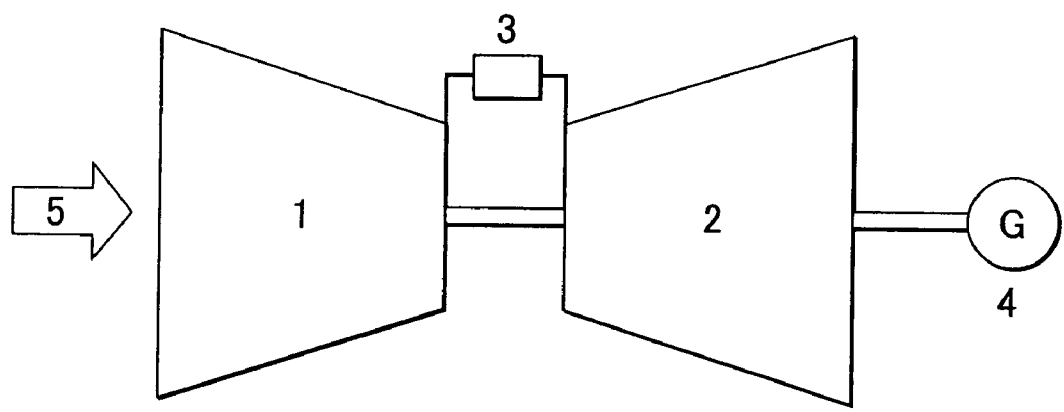
FIG. 6 shows a basic construction of a simple-cycle gas turbine.

A process of manufacturing a gas turbine according to a first embodiment will be described below. FIG. 6 shows a gas turbine plant for a simple cycle. The simple-cycle gas turbine plant comprises a compressor 1 for compressing and delivering air (fluid) 5, a combustor 3 for receiving, as a combustion fluid, the compressed air from the compressor 1 and mixing the combustion fluid with fuel for burning, and a turbine 2 rotated by combustion gas produced from the combustor 3. When the gas turbine is employed to generate electric power, the turbine 2 rotates a generator 4 coupled to it.

A description is now made of the case of manufacturing a gas turbine for a humidified air turbine cycle from the above-described base plant designed for the simple cycle and including the compressor 1, the combustor 3 and the turbine 2. In the humidified air turbine cycle that is a highly efficient cycle utilizing moisture, as shown in FIG. 11, the atmosphere 21 supplied to the compressor 1 is humidified to produce the humid air 5a, and the humid air 5a is compressed by the compressor 1. Then, the high-pressure air 23 extracted from the compressor 1 is added with moisture and then introduced to the combustor 3. When the gas turbine for the humidified air turbine cycle is manufactured from the base plant that has already been designed, the mass flow of the working fluid in the turbine 2 increases 20% corresponding to an amount of moisture added to the high-pressure air 23. This increases the gas turbine output and therefore causes the necessity of modifying the generator 4, etc. Further, because the working fluid flows through the turbine 2 at the increased mass flow, the operating pressure ratio of the compressor 1 increases and the surge margin decreases.

In addition, because parts of the turbine 2 operate at high temperature, e.g., 1350° C., it is desirable from the viewpoint of reliability that the base plant showing proved performance be employed without substantial modifications. Looking from the viewpoint of cost, the turbine 2 requires a higher manufacturing cost than the compressor 1. In the case of manufacturing the gas turbine for the humidified air turbine cycle from the base plant designed for the simple cycle, therefore, it is important to minimize modifications of the turbine 2 and to modify only the compressor 1. To avoid significant changes of the operating pressure ratio of the compressor and the gas turbine output, the mass flow of the combustion gas 36 introduced to the turbine 2 requires to be held at a value not so different from that in the base plant. To that end, the mass flow of the working fluid in the compressor 1 must be smaller than that in the base plant. By forming a channel in the compressor 1 so as to reduce the mass flow of the working fluid passing through the channel in the compressor 1 according to this embodiment, the necessity of modifying the turbine 2 is eliminated. As a result, the gas turbine for the humidified air turbine cycle can be manufactured while maintaining the turbine reliability. Further, since there is no necessity of designing the turbine 2 from the start, the manufacturing cost can be held down.

Figure 1:
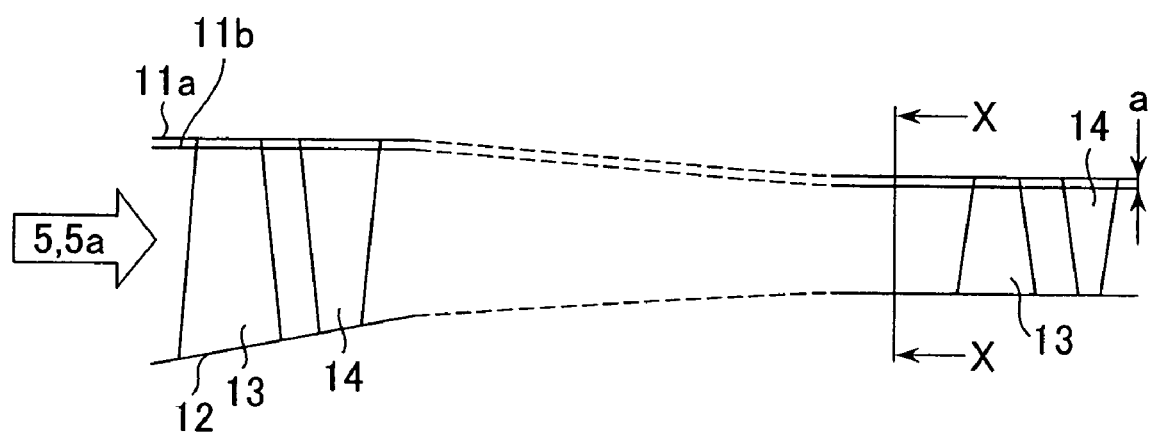
FIG. 1 is a schematic view showing an upper half of a compressor channel in a first embodiment (in the case of reducing the mass flow of a working fluid)
Figure 2:
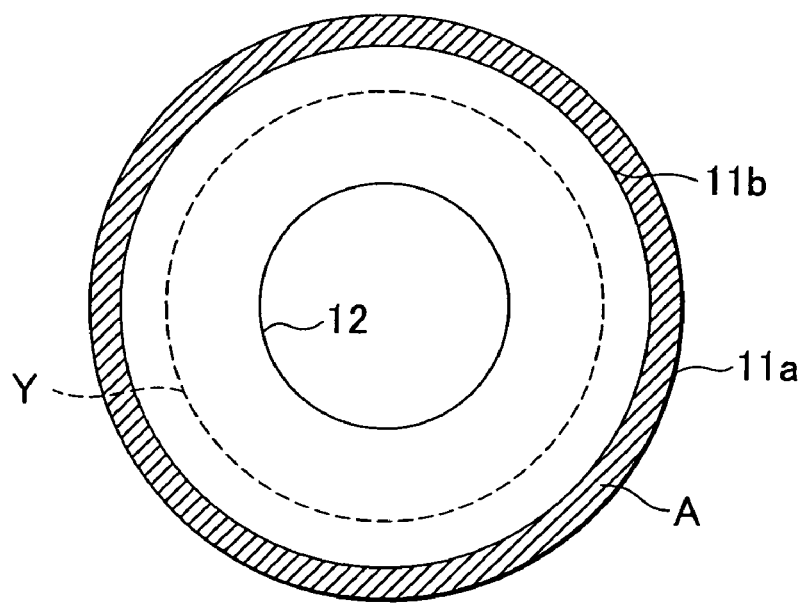
FIG. 2 is a sectional view taken along the line X-X in FIG. 1.

The structure of the compressor 1 will be described below. FIG. 1 is a schematic view showing an upper half of a compressor channel. Although the compressor usually comprises plural stages of stators and rotors, the stators and the rotors in intermediate stages are omitted in FIG. 1. The compressor channel in the state after omitting the stators and the rotors is denoted by dotted lines. FIG. 2 is a view looking from the axial direction of a rotary shaft of the compressor 1; namely it is a sectional view taken along the line X-X in FIG. 1. The compressor 1 comprises compressor rotor disks rotating with the same rotary shaft as the turbine 2, rotor blades 13 mounted respectively to the rotating compressor rotor disks, and stator vanes 14 positioned between two rotor blades 13 on the upstream and downstream sides and fixed to an outer casing. In the case of employing, as the base plant, the gas turbine designed for the simple cycle, the channel in the compressor 1 through which the air 5, serving as the working fluid, passes is formed between an inner surface 12 defined by an outer circumferential surface of each compressor rotor disk and an outer surface 11a defined by an inner circumferential surface of the casing. In this embodiment, the distance from the center of the rotary shaft to the inner surface 12 at an inlet of the compressor 1 is 315 mm, and the distance from the center of the rotary shaft to the outer surface 11a at the inlet of the compressor 1 is 550 mm. Thus, the channel in the compressor 1 has a circular ring shape formed by the inner surface 12 and the outer surface 11a. Further, the cross-sectional area of the channel in the compressor 1 of the base plant designed for the simple cycle is reduced by 0.14 m² in this embodiment. To reduce the cross-sectional area of the channel in the direction of the rotary shaft of the compressor in such a way, the radius from the rotation center of the compressor to the outer surface 11a is reduced by 42 mm in this embodiment by modifying the outer surface 11a to an outer surface 11b. In other words, the distance from the rotation center of the compressor 1 to the outer surface 11b is 508 mm.

Figure 10:
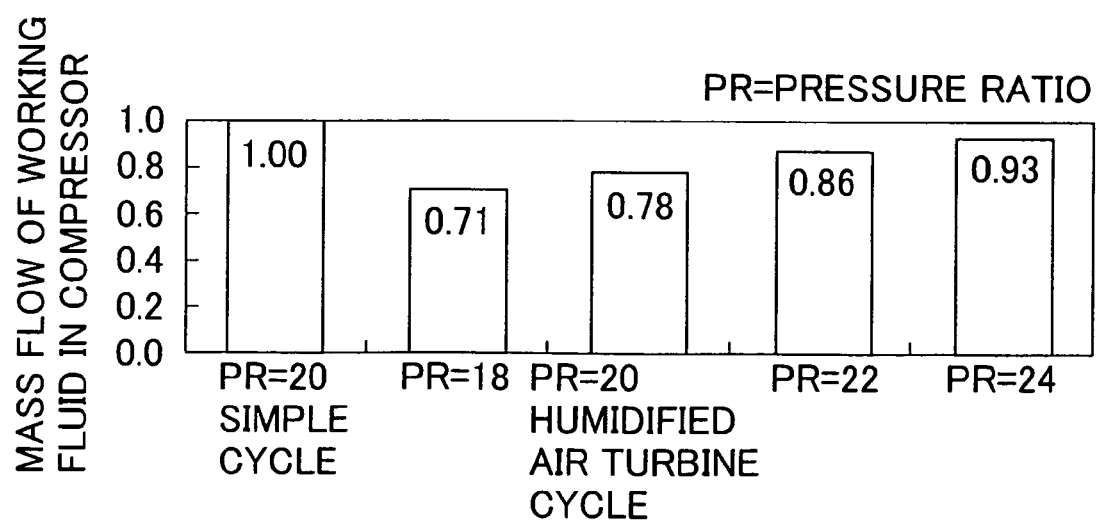
FIG. 10 is a graph representing the mass flow of a working fluid in a compressor when a humidified air turbine cycle is produced based on a simple cycle.

A description is now made of a decrease amount a to be set when the gas turbine for the humidified air turbine cycle is manufactured from the base plant designed for the simple cycle. The decrease amount a is set such that the amount by which the cross-sectional area of the channel is decreased by reducing the radius from the rotation center of the compressor to the outer surface 11a substantially corresponds to the amount by which the mass flow of the working fluid flowing through the compressor 1 is to be decreased. FIG. 10 represents the relationship between the mass flow of the working fluid flowing through the compressor 1 and the operating pressure ratio resulting when the gas turbine for the humidified air turbine cycle is manufactured from the base plant deigned for the simple cycle. In FIG. 10, the mass flow of the working fluid flowing through the compressor 1 deigned for the simple cycle and having the pressure ratio of 20 is assumed to be 1. In the humidified air turbine cycle, at the same pressure ratio as that in the base plant, the mass flow of the working fluid flowing through the compressor 1 has a smaller value, and as the pressure ratio increases, the mass flow of the working fluid also increases to approach that in the base plant. In this embodiment, as described above, the operating pressure ratio of the compressor 1 must be kept substantially equal between the simple cycle and the humidified air turbine cycle. This is because an increase of the operating pressure ratio of the compressor 1 leads to a problem of reducing the surge margin of the compressor 1. For that reason, when the gas turbine for the humidified air turbine cycle is manufactured from the base plant designed for the simple cycle, the mass flow of the working fluid flowing through the compressor is set to 0.78 time that in the simple cycle. Accordingly, the cross-sectional area of the compressor channel is also set to 0.78 time that in the simple cycle. Looking such a reduction of the cross-sectional area of the channel from the direction of the compressor rotary shaft, as shown in FIG. 2, the cross-sectional area of the channel in the compressor designed for the simple cycle is reduced by a cross-sectional area A in the circular ring form. This reduction rate corresponds to the reduction rate of the mass flow of the working fluid, i.e., 0.22. That relationship is expressed by:

(fluid mass flow in the humidified air turbine cycle)/(fluid mass flow in the simple cycle)=(channel cross-sectional area in the humidified air turbine cycle)/(channel cross-sectional area in the simple cycle)=0.78 (Eq. 1)

Therefore, the decrease amount a by which the radius from the rotation center of the compressor to the outer surface 11a is to be reduced can be determined from both the above reduction rate of the channel cross-sectional area and the distance from the rotation center of the compressor to the inner surface. In some of plants to be manufactured, the amount of air extracted from the base plant is changed. However, the change of the mass flow of the working fluid in the compressor should also be taken into consideration to change the channel cross-sectional area when determining the decrease amount a by which the radius from the rotation center of the compressor to the outer surface 11a is to be reduced. Further, when the mass flow of the working fluid is not fairly changed, the decrease amount a in the rear-stage side can be set to a small value, and a significant influence is not produced in some cases even if the outer surface is not modified. In such a case, the radius from the rotation center of the compressor to the outer surface 11a may be reduced only in the front-stage side, and the rear-stage side may remain the same as that in the base plant.

FIG. 1 shows an example in which, in similar stages to those in the base plant, the inner surface and the outer surface both forming the channel are represented by straight-line segments like kinked lines. The number of the straight-line segments is preferably increased as many as possible so that the change of the mass flow of the working fluid and the change of the channel cross-sectional area do not fluctuate from one to another stage.

Figure 12:
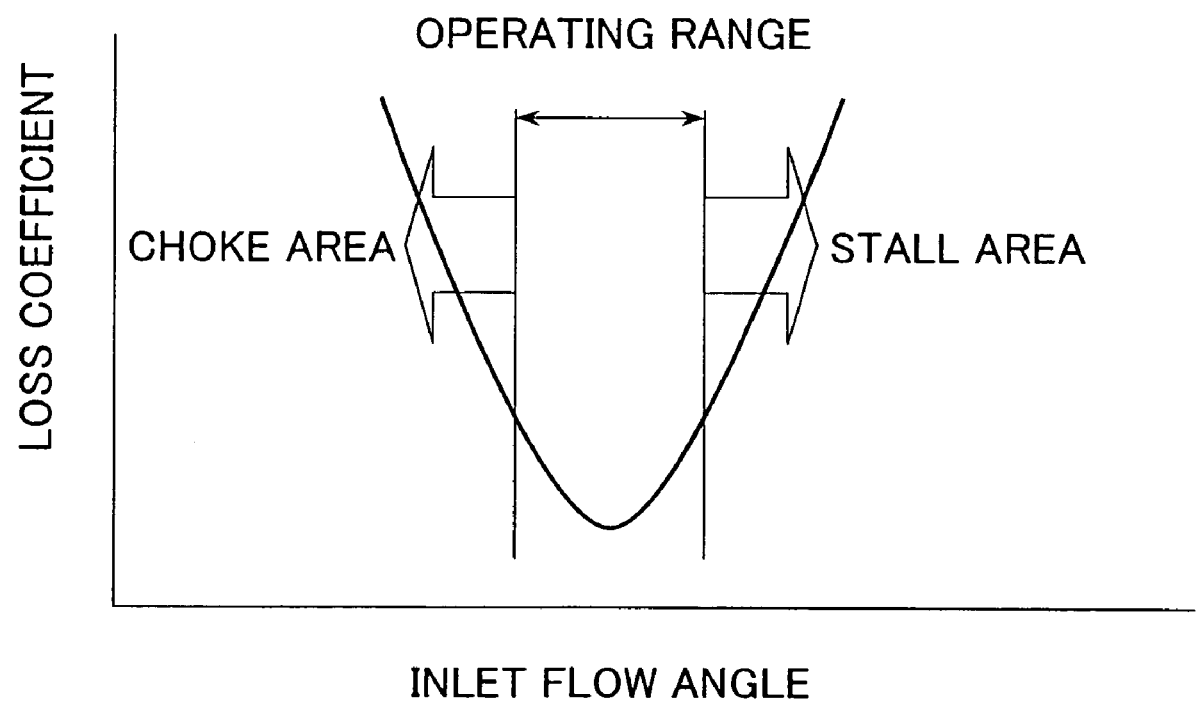
FIG. 12 is a graph representing an operating range of the compressor.

By reducing the radius from the rotation center of the compressor to the outer surface 11a for modification to the outer surface 11b as in this embodiment, inner-side components, such as rotor disks, can be shared by the gas turbine plant of this embodiment and the base plant. Also, a workpiece material of the casing as one of outer-side components can be used in common to the base plant and can be adapted for the gas turbine plant, in which the mass flow of the working fluid in the compressor is reduced, by decreasing an amount by which the workpiece material is to be cut. Thus, the modification from the base plant can be minimized. Further, since the mass flow of the working fluid in the compressor can be changed by altering the distance between the inner surface and the outer surface of the compressor, there is no necessity of newly developing a compressor that can achieve a inlet mass flow suitable for the humidified air turbine cycle. As a result, the modification of the compressor can be minimized. Moreover, by utilizing, as a base, the compressor plant having already been designed and showing proved performance, it is possible to avoid a risk in newly developing a compressor that has a narrow operating range as shown in FIG. 12 and hence faces a difficulty in aerodynamic design. FIG. 12 is a graph representing a range where the compressor is operable. In the graph of FIG. 12, the horizontal axis represents an inlet flow angle, and the vertical axis represents a loss coefficient. As seen from FIG. 12, the operating range where the loss coefficient is small and the compressor is operable is very narrow. Further, the development cost can be cut as compared with the case of developing the gas turbine plant from the start. Additionally, components can be used in common to the compressor of the base plant.

As described above, since the inner-side components, such as the rotor disks, can be used in common by reducing the radius from the rotation center of the compressor to the outer surface 11a for modification to the outer surface 11b, the manufacturing steps can be cut. Also, since the structure of the compressor rotor disks is shared by the gas turbine plant of this embodiment and the base plant, reliability can also be improved. Further, since auxiliary piping constituting the fuel system for the combustor to which the fuel is supplied can be used in common to the base plant, a reduction of the manufacturing cost is resulted.

Figure 8:
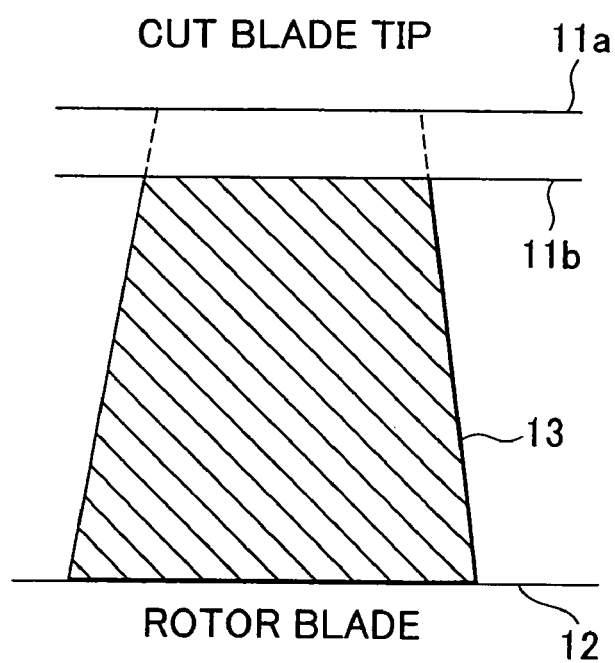
FIG. 8 is a schematic view for explaining a process of modifying a rotor blade.
Figure 9:
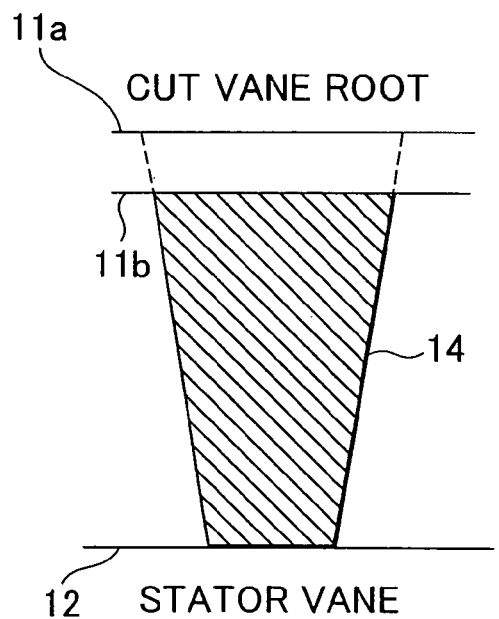
FIG. 9 is a schematic view for explaining a process of modifying a stator vane.

A process of modifying a blade (vane) shape to reduce the cross-sectional area of the channel in the compressor 1 will be described below. FIGS. 8 and 9 illustrate processes of modifying blade and vane shapes, respectively, when the gas turbine for the humidified air turbine cycle is manufactured from the stator vanes and the rotor blades of the compressor in the base plant designed for the simple cycle. In this embodiment, the compressor blades (vanes) in the base plant are each partly cut. More specifically, when the mass flow of the working fluid in the compressor is decreased by reducing the radius from the rotation center of the compressor to the outer surface 11a, a tip portion of the rotor blade on the outer side is cut and a root portion of the stator vane on the outer side is cut as shown in FIGS. 8 and 9. Because combustion gas at high temperature flows through a turbine, a turbine blade (vane) is manufactured by precision casting. Therefore, once the blade (vane) shape is altered, design of the blade (vane) must be restarted from the beginning. On the other hand, in the case of a compressor, the compressor blade (vane) is manufactured by cutting or forging one workpiece material. For that reason, it is relatively easy to manufacture a compressor blade (vane) in the form obtained by partly cutting another one. Accordingly, the compressor blade (vane) for the humidified air turbine cycle can be manufactured in a short time from the compressor blade (vane) for the simple cycle.

The length by which the blade (vane) is to be cut is substantially equal to the decrease amount a described above. By modifying the blade (vane) shape in such a manner, the cross-section of the compressor blade (vane) for the simple cycle and the cross-section of the compressor blade (vane) for the humidified air turbine cycle are kept substantially the same at an equal radius Y from the rotation center of the compressor. If the cross-sectional shape of the blade (vane) is the same between difference cycles in blade (vane) positions at an equal radius from the rotation center of the compressor, the rotating velocity and the velocity triangle are also the same in the respective cross-sections. Therefore, the axial flow velocity in the compressor is the same and so is the mass flow of the working fluid in the respective cross-sections. Stated another way, the mass flow of the working fluid can be increased or decreased corresponding to the amount by which the cross-sectional area of the channel has been cut or increased, without appreciably changing the compressor performance, such as efficiency.

Figure 7:
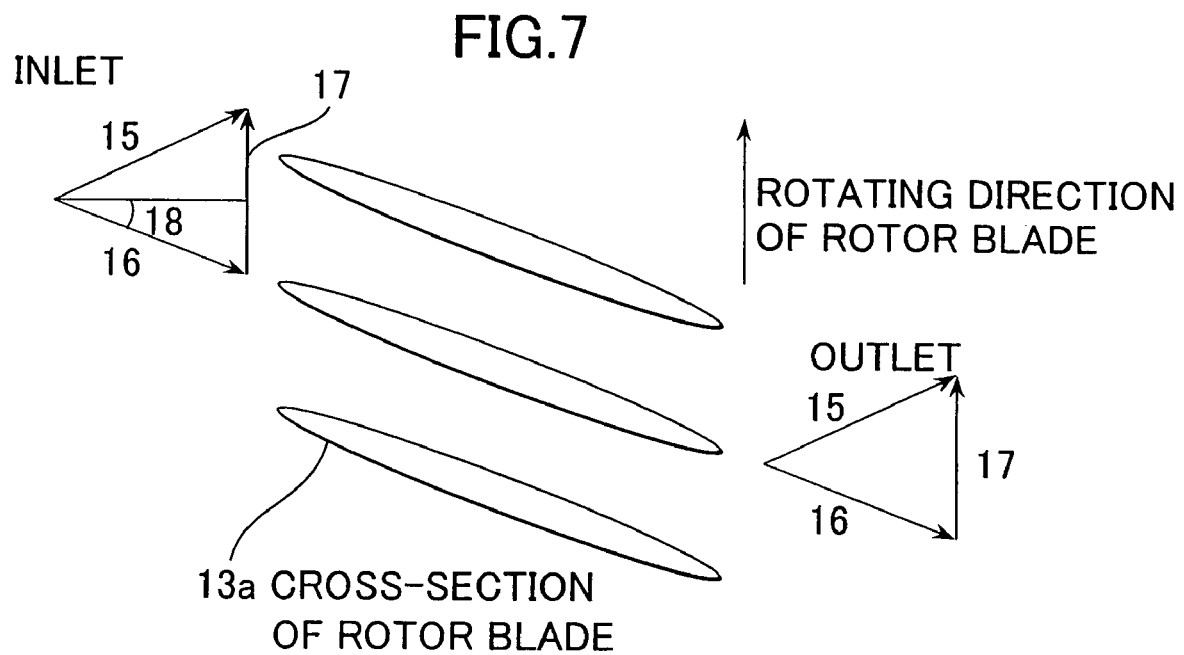
FIG. 7 illustrates a velocity triangle.

The velocity triangle will be described below. FIG. 7 illustrates a velocity triangle when a rotor blade train 13a is rotated in a certain direction. An axial compressor is made up of multiple stages each comprising a rotor blade and a stator vane. A triangle constituted by three vectors, i.e., an absolute velocity vector 15, a relative velocity vector 16 and a rotating velocity 17, at each of an inlet and an outlet of one blade (vane) is called a velocity triangle. For the sake of simplicity, a description is herein made on an assumption that the inlet temperature, the number of rotations, and the rotating velocity are all constant. Generally, in the axial compressor, because the range of inlet flow angle where the blade (vane) operates is narrow, the shape of the velocity triangle is not so changed. Therefore, if the blade (vane) is the same and the radius from the rotation center of the compressor is also the same, the rotating velocity and the velocity triangle are the same in respective cross-sections. Accordingly, the axial flow velocity in the compressor is the same and so is the mass flow of the working fluid passing the respective cross-sections. In practice, the velocity triangle for each stage is adjusted through matching over all the stages, and the gas turbine is operated at the mass flow of the working fluid at which matching is maintained over all the stages. Stated another way, according to the process of reducing or enlarging the channel in the base plant to modify the inlet mass flow of the compressor from that of the base plant as in this embodiment, the blade (vane) has the same shape as that in the base plant in a most part of the channel. As a result, the velocity triangle in each cross-section does not change from that in the base plant, and the mass flow of the working fluid can be increased or decreased corresponding to the amount by which the channel has been reduced or enlarged, without accompanying an appreciable change of performance, such as efficiency.

In practical manufacturing, the blade (vane) may be formed while adjusting the blade (vane) in the base plant, taking into account that a flow field is changed due to the channel portion reduced or enlarged from that in the base plant. For example, a cross-section of the tip or root of the blade (vane) may be twisted to control a secondary flow. In this embodiment, to reduce the radius from the rotation center of the compressor to the outer surface 11a and hence to decrease the mass flow of the working fluid, the tip portion of the rotor blade is cut. Further, the root portion of the stator vane on the outer side is cut. As an alternative, it is instead conceivable to cut a tip portion of the stator vane on the inner side by the decrease amount a without changing the vane shape near the root. However, this modification leads to a reduction of performance because the rotor blade has the same cross-section as that in the base plant at an equal radius from the rotation center of the compressor, but the stator vane has a different cross-section from that in the base plant. In any case, since the blade (vane) length is changed and the natural frequency of the blade (vane) is also changed, design for anti-resonance must be performed again.

Furthermore, when a low-calorie blast-furnace off-gas turbine is manufactured from the base plant designed for the simple cycle, the fuel mass flow is increased from that in the base plant. Accordingly, the mass flow of the working fluid in the turbine is relatively increased from that in the compressor in comparison with the base plant. To avoid significant changes of the operating pressure ratio of the compressor and the gas turbine output, therefore, the mass flow of the working fluid in the compressor 1 must be reduced from that in the base plant by the process according to this first embodiment, etc. without appreciably changing the mass flow of the working fluid in the turbine 2 from that in the base plant.

Figure 17:
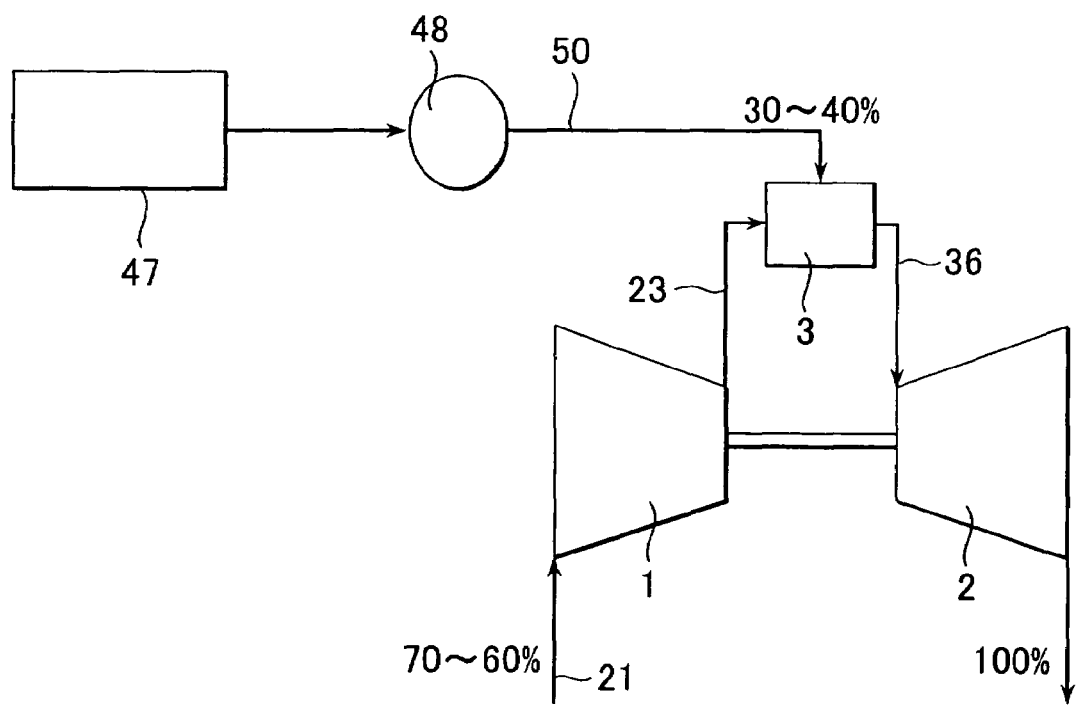
FIG. 17 is a low-calorie blast-furnace off-gas turbine.

The term "low-calorie blast-furnace off-gas turbine" means a system in which blast-furnace off-gas produced from an iron mill is employed as fuel for a gas turbine to generate electric power. As shown in FIG. 17, byproduct gas, e.g., blast-furnace off-gas 47 produced from an iron mill, is compressed by a booster compressor 48, and the boosted blast-furnace off-gas is introduced as fuel 50 to a combustor 3. In the combustor 3, air 23 compressed by a compressor 1 and the fuel 50 are mixed with each other and then burnt to produce high-temperature gas 36. A turbine 2 is rotated by the high-temperature gas 36, and a generator is rotated by shaft motive power produced from the turbine 2, thereby generating electric power.

The blast-furnace off-gas used in such a system has a low calorie value, and therefore a large amount of the blast-furnace off-gas is required as fuel for the gas turbine in order to obtain a predetermined turbine output. Also, in order to mix the blast-furnace off-gas with the air boosted by the compressor and to produce gas at the predetermined high temperature and high pressure in the combustor, the blast-furnace off-gas introduced to the combustor must be boosted in advance by, e.g., the booster compressor.

When the low-calorie blast-furnace off-gas turbine is manufactured from the base plant designed for the simple cycle, the fuel mass flow is increased about 30 to 40% from that in the base plant. Accordingly, the mass flow of the working fluid in the turbine is relatively increased from that in the compressor in comparison with the base plant. To avoid significant changes of the operating pressure ratio of the compressor and the gas turbine output, therefore, the mass flow of the working fluid in the compressor must be reduced from that in the base plant without appreciably changing the mass flow of the working fluid in the turbine from that in the base plant. In that low-calorie blast-furnace off-gas turbine, since the fuel mass flow increases, piping for a fuel system must be modified to have a larger diameter than in the base plant. Moreover, additional auxiliaries, such as the booster compressor for boosting the blast-furnace off-gas, are also required.

In an exhaust-gas recirculation gas turbine of the type that exhaust gas is boosted by a separate compressor and introduced to the combustor 3 instead of recirculating the exhaust gas to the inlet side of the compressor 1, when a gas turbine designed for the simple cycle is employed as the base plant, it is required to reduce the mass flow of air sucked by the compressor 1 by the process according to the first embodiment, etc., or to reduce the mass flow of the exhaust gas recirculated to the combustor 3. However, the process of reducing the mass flow of the exhaust gas recirculated to the combustor 3 lessens the effect of recirculation. For that reason, the process according to the first embodiment is more effective.

Second Embodiment

Figure 3:
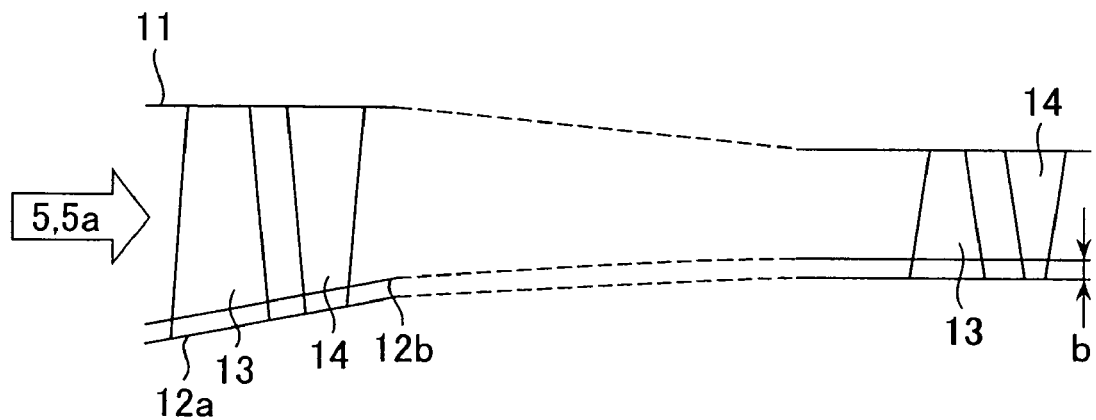
FIG. 3 is a schematic view showing an upper half of a compressor channel in a second embodiment.

FIG. 3 shows an upper half of a compressor channel in a second embodiment. In FIG. 3, as in FIG. 1, the compressor channel in intermediate stages is denoted by dotted lines. In the second embodiment, as in the first embodiment, the mass flow of the working fluid in the compressor 1 is reduced when a gas turbine for a different gas turbine cycle is manufactured from the base plant designed for one desired gas turbine cycle and comprising the compressor 1, the combustor 3 and the turbine 2. More specifically, in this embodiment, the mass flow of the working fluid in the compressor 1 is reduced by increasing the radius from the rotation center of the compressor to an inner surface 12a by an amount b such that a new inner surface 12b is formed. With this embodiment, the inner-side components, such as the compressor rotor disks, cannot be used in common, but the outer-side components, such as the casing, can be used in common.

In the case of reducing the mass flow of the working fluid in the compressor 1, it is also feasible to reduce the radius from the rotation center of the compressor to the outer surface and to increase the radius from the rotation center of the compressor to the inner surface at the same time instead of either reducing the radius from the rotation center of the compressor to the outer surface as in the first embodiment or increasing the radius from the rotation center of the compressor to the inner surface as in the second embodiment. This method makes smaller the amounts by which the inner and outer surfaces of the compressor channel are to be changed, in comparison with the case of reducing the mass flow of the working fluid by modifying only one of the inner and outer surfaces. As a result, a change of the secondary flow caused by the endwall of the compressor can be reduced with respect to the secondary flow in the base plant. Another conceivable method of decreasing the mass flow of the working fluid by reducing the cross-sectional area of the channel is to reduce both the radius from the rotation center of the compressor to the inner surface and the radius from the rotation center of the compressor to the outer surface.

Third Embodiment

Figure 4:
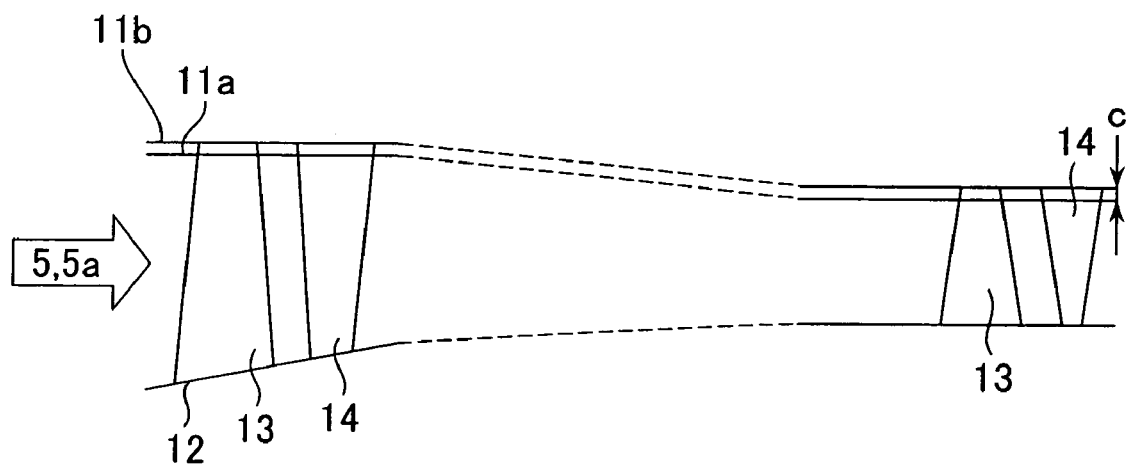
FIG. 4 is a schematic view showing an upper half of a compressor channel in a third embodiment

FIG. 4 shows an upper half of a compressor channel in a third embodiment. In FIG. 4, as in FIG. 1, the compressor channel in intermediate stages is denoted by dotted lines. In the third embodiment, contrary to the first embodiment, the mass flow of the working fluid in the compressor 1 is increased when a gas turbine for a different gas turbine cycle is manufactured from the base plant designed for one desired gas turbine cycle and comprising the compressor 1, the combustor 3 and the turbine 2. More specifically, in this embodiment, the mass flow of the working fluid in the compressor 1 is increased by increasing the radius from the rotation center of the compressor to the outer surface 11a by an amount c such that a new outer surface 11b is formed. Since each of the rotor blades 13 in an area where the compressor channel is enlarged has a larger rotating velocity, the effect of reducing a blade load is obtained and the efficiency is increased to some extent. Also, a workpiece material of the casing as one of the outer-side components can be used in common to the base plant and can be adapted for the gas turbine plant, in which the mass flow of the working fluid in the compressor is increased, by increasing an amount by which the workpiece material is to be cut. Thus, the modification from the base plant can be minimized.

Further, in some cases, the inlet mass flow of the compressor 1 is increased to increase the output of a gas turbine under development. In such a case, the mass flow of the working fluid in the compressor can be increased without changing performance, such as efficiency, by increasing the radius from the rotation center of the compressor to the outer surface as in this embodiment.

Fourth Embodiment

Figure 5:
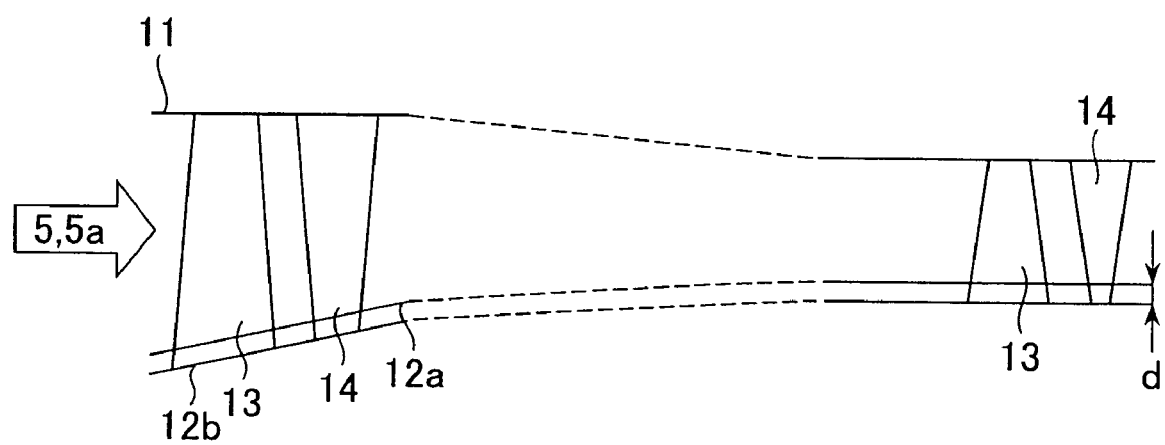
FIG. 5 is a schematic view showing an upper half of a compressor channel in a fourth embodiment.

FIG. 5 shows an upper half of a compressor channel in a fourth embodiment. In FIG. 5, as in FIG. 1, the compressor channel in intermediate stages is denoted by dotted lines. The fourth embodiment represents the case in which the mass flow of the working fluid in the compressor 1 is increased as in the third embodiment. More specifically, the mass flow of the working fluid in the compressor 1 is increased by reducing the radius from the rotation center of the compressor to the inner surface 12a by an amount d such that a new inner surface 12b is formed. With this embodiment, the mass flow of the working fluid in the compressor 1 can be increased even in the case that the casing requires to be used in common and the process according to the third embodiment cannot be employed because of a too small thickness of the casing.

In the case of increasing the mass flow of the working fluid in the compressor 1, it is also feasible to increase the radius from the rotation center of the compressor to the outer surface and to reduce the radius from the rotation center of the compressor to the inner surface at the same time instead of either increasing the radius from the rotation center of the compressor to the outer surface as in the third embodiment or reducing the radius from the rotation center of the compressor to the inner surface as in the fourth embodiment. This method makes smaller the amounts by which the inner and outer surfaces of the compressor channel are to be changed, in comparison with the case of increasing the mass flow of the working fluid by modifying only one of the inner and outer surfaces. As a result, a change of the secondary flow caused by the endwall of the compressor can be reduced with respect to the secondary flow in the base plant. Another conceivable method of increasing the mass flow of the working fluid by increasing the cross-sectional area of the channel is to increase both the radius from the rotation center of the compressor to the inner surface and the radius from the rotation center of the compressor to the outer surface. In this case, the radius from the rotation center of the compressor to the outer surface must be further increased in comparison with the case of increasing only that radius. However, since the average rotating velocity is increased, the blade load is reduced and the efficiency can be increased.

Fifth Embodiment

Figure 15A:
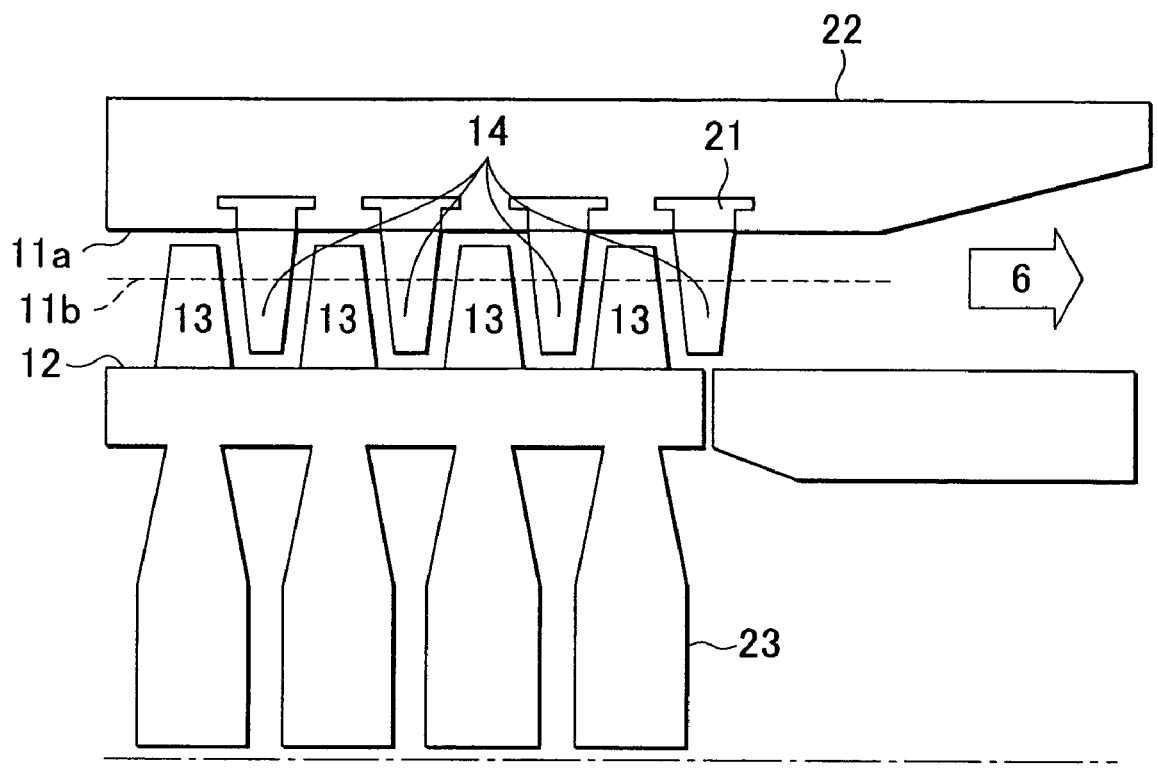
FIGS. 15A and 15B are longitudinal and transverse sectional views showing the upper half of the compressor channel shown in FIG. 1.
Figure 15B:
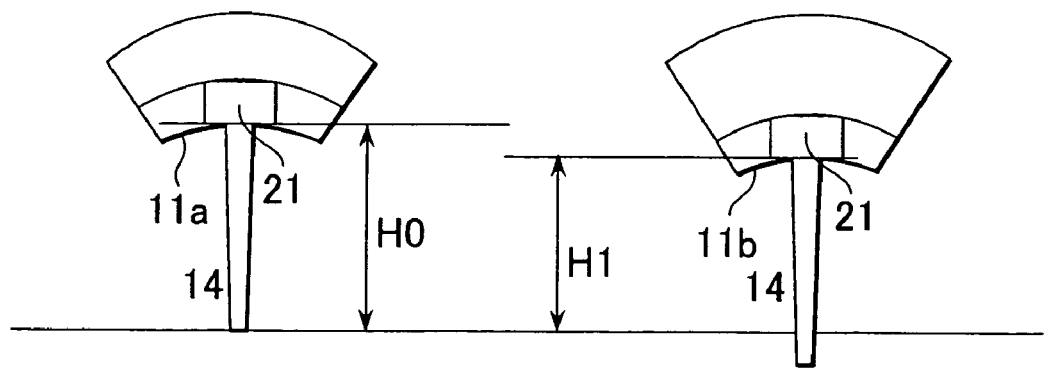
Figure 16:
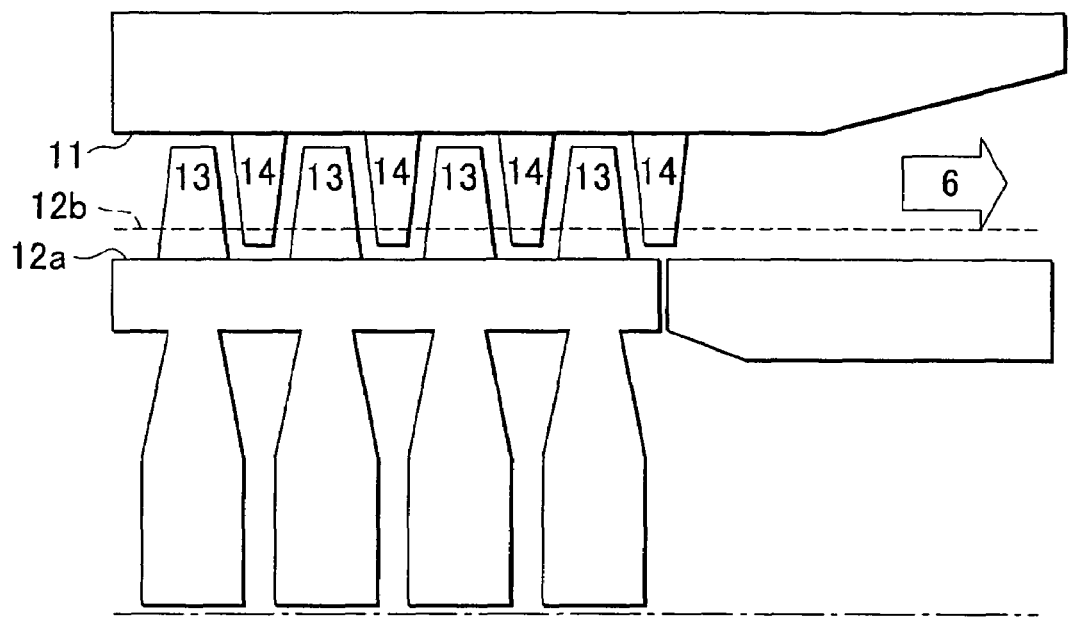
FIG. 16 is a sectional view showing the upper half of the compressor channel shown in FIG. 2.

FIGS. 15 and 16 show a sectional structure of an upper half of a channel in an axial compressor 1. The compressor channel is a ring-shaped channel defined by compressor rotor disks 23 rotating with the same rotary shaft as a turbine, and a casing 22 disposed around the compressor rotor disks 23 to constitute the stationary side. Rotor blades 13 are fixedly mounted to an inner surface 12 of the compressor channel, which is defined by the rotating compressor rotor disks, and stator vanes 14 are fixedly mounted to an outer surface 11 of the compressor channel, which is defined by the casing, such that each stator vane is positioned between two adjacent rotor blades 13 on the upstream and downstream sides. In a multistage axial compressor, each stage comprises a pair of the rotor blade 13 mounted to a rotary shaft and the stator vane 14 mounted to the casing. The multistage axial compressor sucks air (atmosphere) and compresses the sucked air through successive stages to predetermined pressure, thereby producing high-pressure air.

FIG. 15A shows the compressor channel of FIG. 1 in more detail on an assumption that the channel has a linear shape. In particular, FIG. 15A shows four stages of the compressor 1 near its final stage. In a simple-cycle gas turbine, a compressed fluid 6 is introduced to the combustor 3. The stator vane 14 is mounted to the casing 22 with the aid of a dovetail 21. The rotor blade 13 is mounted to the rotor disk 23 with the aid of a dovetail 21. Note that the dovetail 21 of the rotor blade 13 does not appear in a cross-section of FIG. 15A, and therefore it is not shown in FIG. 15A. When a gas turbine for the humidified air turbine cycle is manufactured by modifying an outer surface 11a of the channel in the base plant designed for the simple cycle, the radius from the rotation center of the compressor to the outer surface 11a is reduced such that a new outer surface 11b is formed. FIG. 15B shows a part of the sectional structure in FIG. 15A, looking from a cylinder cross-section perpendicular to the rotary shaft. As seen from FIG. 15B, a height H0 of the outer surface 11a is reduced to a height H1 of the outer surface 11b. For such a modification, a vane portion of the stator vane 14 is cut and the position of the dovetail 21 of the stator vane 14 is lowered as viewed in FIGS. 15A and 15B. At that occasion, by cutting the stator vane 14 such that the shape of the stator vane 14 until the height H1 remains the same as the vane shape in the base plant until the height H1, the velocity triangle is held the same, as described above, in respective vane cross-sections between the base plant designed for the simple cycle and the gas turbine for the humidified air turbine cycle.

FIG. 16 shows the compressor channel of FIG. 2 in more detail on an assumption that the channel has a linear shape as in FIG. 15. In particular, FIG. 16 shows four stages of the compressor 1 near its final stage. When a gas turbine for the humidified air turbine cycle is manufactured by modifying an inner surface 12a of the channel in the base plant designed for the simple cycle, the radius from the rotation center of the compressor to the inner surface 12a is increased such that a new inner surface 12b is formed. For such a modification, in the case of FIG. 16, a blade portion of the rotor blade 13 is cut and the position of the dovetail 21 (not shown) of the rotor blade 13 is raised as viewed in FIG. 16. At that occasion, by cutting the rotor blade 13 as in the above case of FIG. 15 such that the shape of the remaining rotor blade having been not cut remains the same as the blade shape in the base plant, the velocity triangle is held the same, as described above, in respective blade cross-sections between the base plant designed for the simple cycle and the gas turbine for the humidified air turbine cycle.

What is claimed is:

1. A manufacturing process of a gas turbine for use in manufacturing a gas turbine from a base plant comprising a gas turbine designed for one desired gas turbine cycle and including a compressor with a channel to compress a fluid flowing inside a casing to which stator vanes are fixed, said manufactured gas turbine having a different gas turbine cycle, said process comprising the steps of:

forming said compressor channel for the fluid to have an inner surface defined by an outer circumferential surface of each of compressor rotor disks and an outer surface defined by an inner circumferential surface of said casing, changing the distance between said inner surface and said outer surface in comparison with a corresponding distance in said base plant without deleting or adding stages of said compressor, and cutting a tip portion of a rotor blade or a root portion of said stator vane by a length substantially equal to an amount by which the radius from a rotation shaft center of said compressor to said outer surface has been reduced.

2. A manufacturing process of a gas turbine that is manufactured with respect to a first gas turbine from a base plant having one desired gas turbine cycle, said manufactured gas turbine including a compressor, the compressor having compressor rotor disks, a casing to which stator vanes are fixed and a channel for compressing a fluid flowing inside the casing, wherein the manufactured gas turbine has a gas turbine cycle that is different from said one gas turbine cycle, said processing comprising the steps of:

forming said compressor channel for the fluid to have an inner surface defined by an outer circumferential surface of each of said compressor rotor disks and an outer surface defined by an inner circumferential surface of said casing, changing the distance between said inner surface and said outer surface in comparison with the corresponding distance in said base plant such that a mass flow of the fluid passing through said compressor channel is different from that of a comparable channel of a compressor of said one gas turbine cycle without deleting or adding stages for said compressor, and cutting a tip portion of a roto blade or a root portion of said stator vane by a length substantially equal to an amount by which a radius from the rotation shaft center of said compressor to said outer surface has been reduced.

* * * * *